United States Patent
Ichimoto et al.

(10) Patent No.: US 7,434,385 B2
(45) Date of Patent: Oct. 14, 2008

(54) DEVICE FOR RESTRAINING THE DETERIORATION OF A CATALYTIC APPARATUS OF AN INTERNAL COMBUSTION ENGINE

(75) Inventors: Kazuhiro Ichimoto, Nissin (JP); Kouichi Oosawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/555,409

(22) PCT Filed: May 18, 2004

(86) PCT No.: PCT/JP2004/007035

§ 371 (c)(1),
(2), (4) Date: Nov. 3, 2005

(87) PCT Pub. No.: WO2004/101979

PCT Pub. Date: Nov. 25, 2004

(65) Prior Publication Data

US 2006/0117739 A1    Jun. 8, 2006

(30) Foreign Application Priority Data

May 19, 2003   (JP)   ............... 2003-140756

(51) Int. Cl.
*F01N 3/00* (2006.01)
(52) U.S. Cl. .......................... 60/277; 60/285
(58) Field of Classification Search .............. 60/276, 60/277, 285, 299; 180/65.2, 64
See application file for complete search history.

(56) References Cited

U.S. PATENT DOCUMENTS

| 5,570,575 | A   | * | 11/1996 | Sato et al. ..................... 60/277 |
| 6,032,753 | A   |   | 3/2000  | Yamazaki et al. |
| 6,059,057 | A   |   | 5/2000  | Yamazaki et al. |
| 6,335,573 | B1  | * | 1/2002  | Eguchi et al. ............. 290/40 C |
| 6,519,513 | B2  | * | 2/2003  | Nakagawa et al. ........... 701/22 |
| 6,526,745 | B1  | * | 3/2003  | Ogiso ......................... 60/285 |
| 6,569,055 | B2  | * | 5/2003  | Urasawa et al. ............... 477/5 |
| 6,595,307 | B2  | * | 7/2003  | Suzuki ..................... 180/65.2 |
| 6,895,744 | B2  | * | 5/2005  | Osawa ........................ 60/277 |

FOREIGN PATENT DOCUMENTS

| EP | 0 866 219 A2 | 9/1998 |
| EP | 1 359 305 A2 | 11/2003 |
| JP | A 08-079914  | 3/1996 |
| JP | A 9-329060   | 12/1997 |
| JP | A-10-248114  | 9/1998 |
| JP | A 10-248114  | 9/1998 |
| JP | A-10-252532  | 9/1998 |
| JP | A 10-252532  | 9/1998 |

(Continued)

*Primary Examiner*—Thomas Denion
*Assistant Examiner*—Diem Tran
(74) *Attorney, Agent, or Firm*—Oliff & Berridge, PLC

(57) ABSTRACT

In a device for restraining the deterioration of a catalytic apparatus of an internal combustion engine of the present invention, when the temperature of the catalytic apparatus arranged in the engine exhaust system is higher than a predetermined temperature in a vehicle deceleration, a fuel-cut of the engine is prohibited and a first motor-generator MG2 connected with the vehicle drive shaft 6 is operated as a generator to charge an electrical accumulator 8.

7 Claims, 2 Drawing Sheets

FOREIGN PATENT DOCUMENTS

| | | |
|---|---|---|
| JP | A-10-280990 | 10/1998 |
| JP | A 10-280990 | 10/1998 |
| JP | A 11-107825 | 4/1999 |
| JP | A-11-107825 | 4/1999 |
| JP | A-2000-161099 | 6/2000 |
| JP | A-2001-59444 | 3/2001 |
| JP | A-2001-059444 | 3/2001 |
| JP | A-2001-309504 | 11/2001 |

* cited by examiner

DEVICE FOR RESTRAINING THE DETERIORATION OF A CATALYTIC APPARATUS OF AN INTERNAL COMBUSTION ENGINE

TECHNICAL FIELD

The present invention relates to a device for restraining the deterioration of a catalytic apparatus of an internal combustion engine.

BACKGROUND ART

A catalytic apparatus for purifying the exhaust gas is arranged in the engine exhaust system. A catalyst, such as a noble metal catalyst, carried on the catalytic apparatus sinters and deteriorates when it is exposed to excessive oxygen at a high temperature.

In engine deceleration, a fuel-cut is usually carried out. However, if a fuel-cut is carried out when a temperature of the catalyst is high, the deterioration of catalyst is caused by the exhaust gas in a lean condition as the mentioned above. Accordingly, it is suggested that, when the temperature of the catalyst is high, a fuel-cut is prohibited in an engine deceleration (refer to, for example, Japanese Unexamined Patent Publications Nos. 10-252532, 2001-59444, 10-280990, 11-107825, and 10-248114.)

In the above background art, when a fuel-cut is prohibited, the engine is operated in a condition in which an amount of intake air is minimized such that the engine is not stopped. However, in this case, an engine-brake becomes insufficient in comparison with a case where a fuel-cut is carried, and thus a good vehicle deceleration cannot be realized.

DISCLOSURE OF THE INVENTION

Therefore, an object of the present invention is to provide a device, for restraining the deterioration of a catalytic apparatus of an internal combustion engine, which can restrain the deterioration of catalyst at a high temperature and realize a good vehicle deceleration.

According to the present invention, there is provided a device for restraining the deterioration of a catalytic apparatus of an internal combustion engine characterized in that when the temperature of the catalytic apparatus arranged in the engine exhaust system is higher than a predetermined temperature in a vehicle deceleration, a fuel-cut of the engine is prohibited and a first motor-generator connected with the vehicle drive shaft is operated as a generator to charge an electrical accumulator.

BEST MODE FOR CARRYING OUT THE INVENTION

Figure 1:
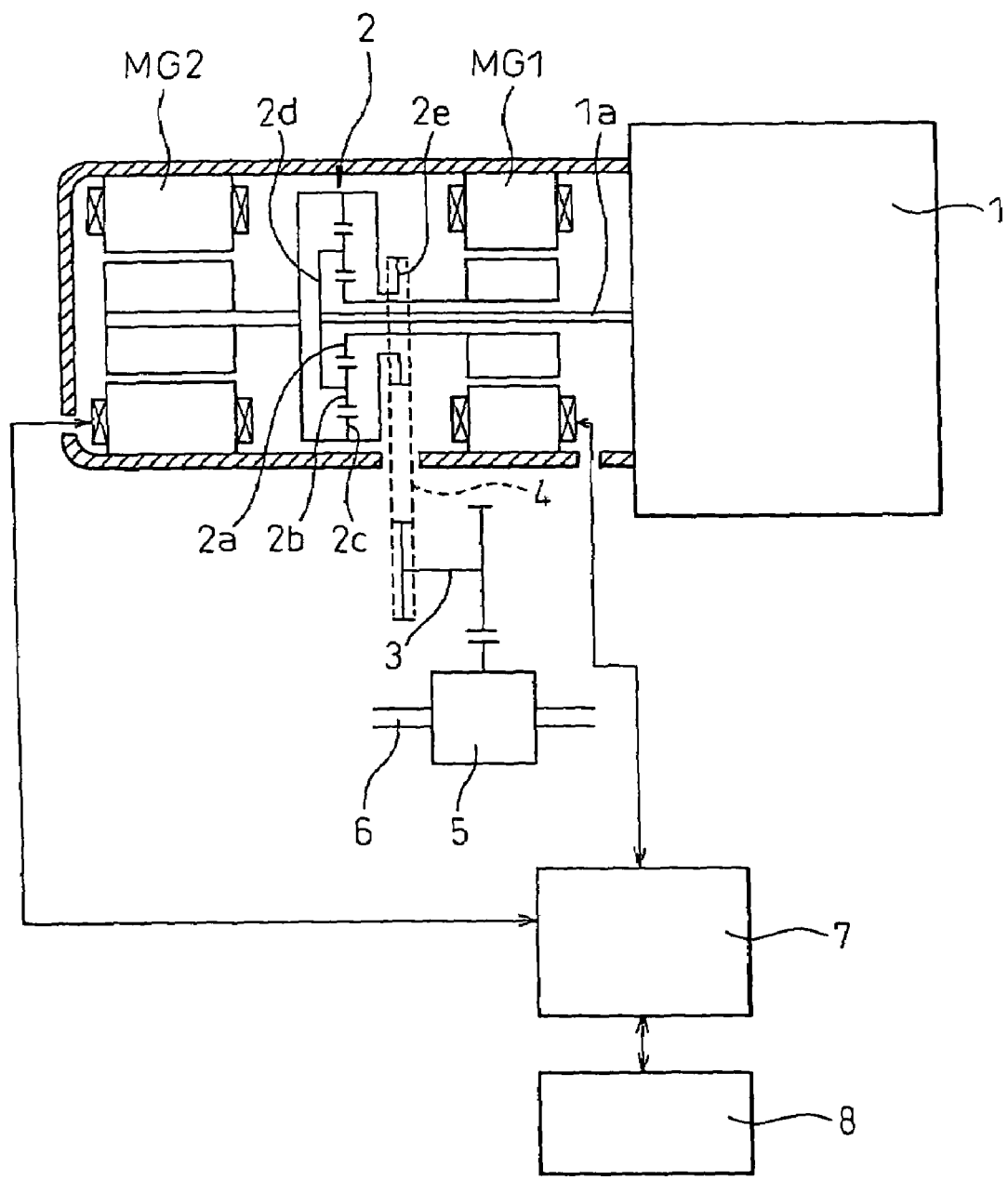
FIG. 1 is a schematic view showing an engine drive system to which a device for restraining the deterioration of a catalytic apparatus according to the present invention is mounted.

FIG. 1 is a schematic view showing an engine drive system on which a device for restraining the deterioration of a catalytic apparatus according to the present invention is mounted. In FIG. 1, reference numeral 1 designates an engine and reference numeral 1a designates an output shaft of the engine 1. The engine 1 is, for example, a gasoline engine and is operated at the stoichiometric air fuel ratio. A throttle valve arranged in the engine intake system is not connected mechanically to the accelerator pedal and is allowed to be freely opened by an actuator such as a step motor. In the engine exhaust system, a three-way catalytic converter is arranged as a catalytic apparatus for purifying the exhaust gas. MG2 is a first motor-generator and MG1 is a second motor-generator.

The engine 1, MG1, and MG2 are connected with a three-shaft-type power input and output device 2 which is well known. The three-shaft-type power input and output device 2 comprises a sun gear 2a on the inside, a plurality of planetary gears 2b meshed with the sun gear 2a, and a ring gear 2c on the outside which is meshed with the planetary gears 2b. The rotor of MG1 is connected with the sun gear 2a. The output shaft 1a of the engine 1 is connected with a ring-like planetary carrier 2d which rotatably supports a plurality of center axes of the planetary gears 2b. The rotor of MG2 is connected with the ring gear 2c.

To allow such a construction, in the present embodiment, the rotor of MG1, the sun gear 2a, and the connecting shaft for connecting the rotor with the sun gear 2a are hollow and are penetrated by the output shaft 1a of the engine 1. The ring gear 2c is provided with a power output gear 2e. The power output gear 2e and a power transmission gear 3 are connected by a chain belt 4. The power transmission gear 3 meshes with a differential gear unit 5 and transmits power to a vehicle drive shaft 6.

MG1 and MG2 are constructed as synchronous motor-generators. Permanent magnets are mounted on each rotor and three-phase coils wound on each stator of them are connected electrically with a battery 8 as an electrical accumulator via a control unit 7 containing an inverter. Magnetic fields formed by three-phase coils are controlled by the control unit 7 and thus MG1 and MG2 can each function as a motor which produces a torque to the three-shaft-type power input and output device 2 by use of the electric energy accumulated by the battery 8 or as a generator which charge the battery 8 by use of the torque from the three-shaft-type power input and output device 2.

Figure 2:
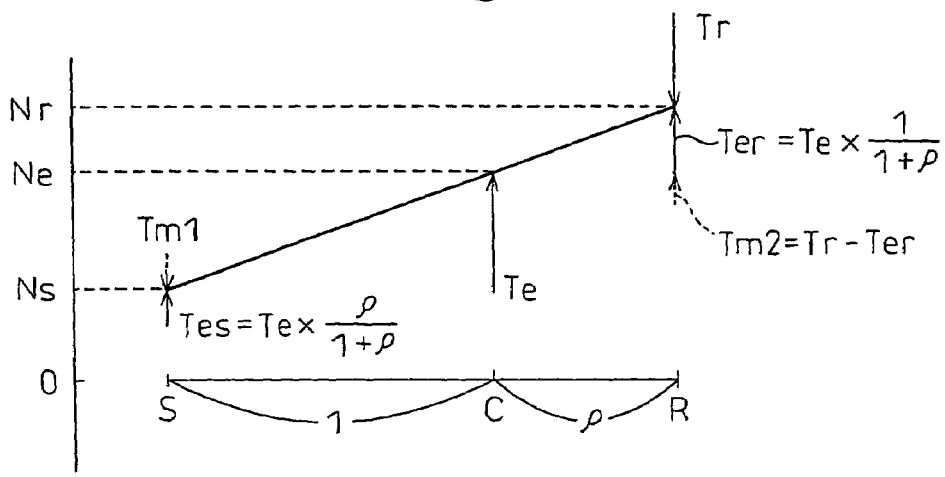
FIG. 2 is a graph showing a relationship between rotational speeds and torques in a three-shaft-type power input and output device.

Relationships between rotational speeds and torques of the three shafts (the sun gear 2a, the planetary carrier 2d, and the ring gear 2c) in the three-shaft-type power input and output device 2 can be easily represented by use of the graph shown in FIG. 2. In FIG. 2, the ordinate represents rotational speeds of the three shafts and the abscissa represents the positions of the three shafts. When the position of the sun gear 2a is (S) and the position of the ring gear is (R), the position (C) of the planetary carrier 2d is a position that is divided at 1:ρ between the positions (S) and (R). Here, ρ is a ratio of the teeth number (nr) of the ring gear 2c and the teeth number (ns) of the sun gear, i.e., ρ=ns/nr.

When the speed of the engine 1, i.e, the rotational speed of the planetary carrier 2d is (Ne) and the rotational speed of the ring gear 2c is (Nr), if a straight line (operating line) is drawn so as to pass through the points (C, Ne) and (R, Nr), an ordinate (Ns) corresponding to the abscissa (S) on the straight line becomes the rotational speed of the sun gear 2a. Here, when the rotational speed (Ne) of the planetary carrier 2d is low, the rotational speed of the sun gear 2a may become smaller than 0, i.e., the sun gear 2a may rotate in reverse. There are relationships between the rotational speeds of the three shafts such that a rotational speed of one shaft can be decided on the basis of rotational speeds of the remaining two shafts.

In connection with the torques, the torque of the engine 1, i.e., the torque (Te) of the planetary carrier 2d affects on the operating line at the abscissa (C). This torque (Te) is divided into a torque (Tes) which affects on the operating line at the abscissa (S) and a torque (Ter) which affects on the operating line at the abscissa (R). The torques (Tes) and (Ter) are represented by the following formulas.

$$Tes = Te * \rho/(1+\rho)$$

$$Ter = Te * 1/(1+\rho)$$

When the operating line is stable at this condition, the forces on the operating line are balanced. Namely, at the abscissa (S), a torque (Tm1) which has a magnitude equal with that of (Tes) and a direction opposite to that of (Tes) is affected, and at the abscissa (R), a torque (Tm2) is added to (Ter) such that a magnitude thereof becomes equal with that of the torque (Tr) that is produced from the ring gear 2c and a direction thereof becomes opposite to that of (Tr). The torque (Tm1) is produced by MG1 and the torque (Tm2) is produced by MG2. In this case, the direction of the torque (Tm1) is opposite to that of the torque (Te) of the planetary carrier 2d so that MG1 operates as the generator and thus electrical energy (Pm1) which is represented as the product of the torque (Tm1) and the rotational speed (Ns) is regenerated to the battery 8. On the other hand, the direction of the torque (Tm2) is equal to that of the torque (Te) of the planetary carrier 2d so that MG2 operates as the motor and thus an electric energy (Pm2) which represents as the product of the torque (Tm2) and the rotational speed (Nr) is taken from the battery 8. Here, when the product of the torque (Te) of the engine 1 and the engine speed (Ne) is equal to the product of the torque (Tr) produced from the ring gear 2c and the rotational speed (Nr), the regenerating electric energy (Pm1) of MG1 becomes equal to the consuming electric energy (Pm2) of MG2, i.e., the vehicle runs by using only the torque of the engine 1.

The engine 1 operates in a highly efficient condition. At this condition, if the output torque produced from the ring gear 2c is smaller than the required torque as shown in FIG. 2, MG2 functions as the motor and carries out a torque-assist. On the other hand, if the output torque produced from the ring gear 2c is larger than the required torque, MG2 functions as a generator and regenerates the unnecessary torque as electrical energy. Thus, the engine 1 can operate with very low fuel consumption. When the vehicle is accelerated, if the engine 1 is accelerated, the fuel consumption deteriorates. Therefore, when the vehicle is accelerated, MG2 functions as the motor. MG1 can function as a starter motor.

By the way, when the vehicle is decelerated, the engine 1 usually carries out a fuel-cut so that engine-braking is produced and the fuel consumption is reduced. However, when the temperature of the catalytic apparatus arranged in the exhaust system is high, for example, higher than 700 degrees C., if the exhaust gas (air) at a lean condition during the fuel-cut flows into the catalytic apparatus, the noble metal catalyst carried on the catalytic apparatus sinters and deteriorates. In the present invention, it is intended to restrain this catalyst deterioration so that the control unit 7 controls the engine 1, MG1, and MG2 as a device for restraining the catalyst deterioration.

Figure 3:
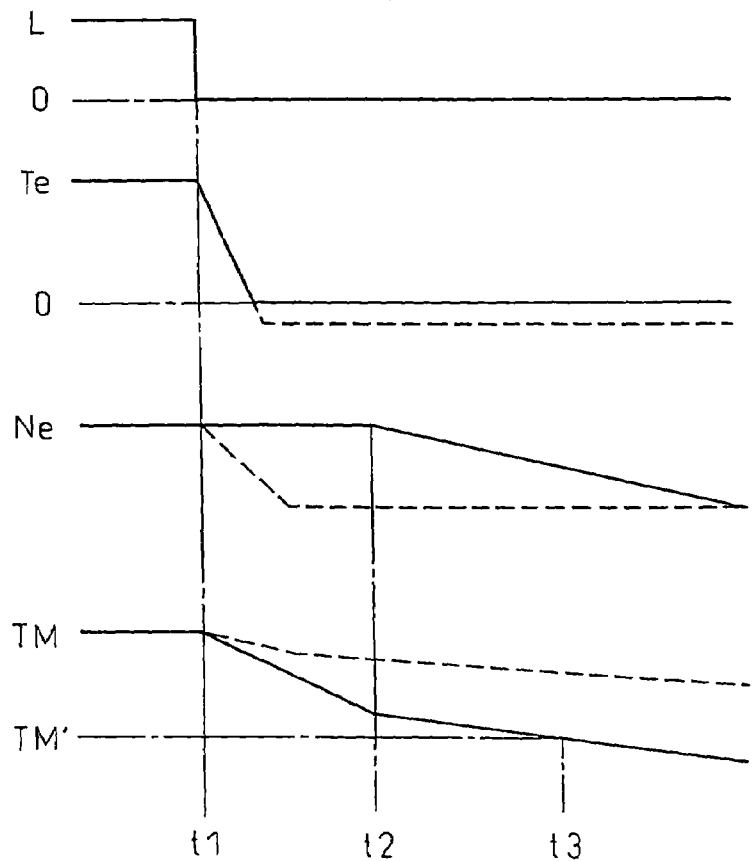
FIG. 3 is a time-chart showing changes in an amount of depression of the accelerator pedal (L), an engine torque (Te), an engine speed (Ne), and a temperature of the catalytic apparatus (TM).

FIG. 3 is a time-chart showing changes of an amount of depression of the accelerator pedal (L), a torque of the engine 1 (Te), an engine speed (Ne), and a temperature of the catalytic apparatus, i.e., a temperature of the catalyst (TM) when the vehicle is decelerated. At a time (t1), the accelerator pedal is released and, when an amount of depression of the accelerator pedal becomes 0, an amount of intake air is rapidly reduced by the throttle valve. Accordingly, the torque of the engine 1 (Te) is also rapidly reduced (in fact, a slight delay occurs). The torque of the output shaft of the engine 1 (Te) is reduced to just 0 to compensate the friction itself of the engine 1 and the like. Thereafter, an amount of intake air is controlled by the throttle valve to take account of the engine speed such that the torque is maintained at 0.

With the operation in which the torque (Te) of the engine 1 is made 0, the vehicle is decelerated. However, the produced engine-braking is not large enough that a fuel-cut is carried out. Therefore, to provide a good vehicle deceleration, MG2 connected with the vehicle drive shaft 6 via the ring gear 2c and the like is operated as the generator and thus a load thereof is made to act on the vehicle drive shaft 6 to sufficiently decelerate vehicle.

Thus, the electrical energy generated by MG2 is charged into the battery 8. However, the battery 8 cannot be charged without limitation so that when an amount of charge in the battery 8 reaches a predetermined value, MG2 cannot be operated as the generator. At this time, if the vehicle deceleration is almost finished, no problem occurs. However, if the vehicle deceleration must be still continued, a fuel-cut starts in the engine 1 or an amount of intake air is minimized and the engine 1 operates such that the torque (Te) of the output shaft engine-becomes lower than 0 but the engine does not stop by use of an inertial force itself, as shown by the dot line in FIG. 3.

An amount of intake air, in the above-mentioned engine operation in which the torque (Te) of the output shaft of the engine is made 0, can be made larger than that in the engine operation in which an amount of intake air is minimized such that the engine does not stop. Therefore, an amount of exhaust gas in the engine operation in which the torque is made 0 becomes large and thus the catalytic apparatus can be cooled down favorably. Accordingly, before an amount of charge in the battery 8 reaches the predetermined value, the temperature of the catalytic apparatus can be made lower than the threshold (TM') that is used to determine that the temperature is high. Therefore, when a fuel-cut starts, the catalyst deterioration does not occur. Further, in the engine operation in which an amount of intake air is minimized such that the engine does not stop, an air-fuel ratio of the exhaust gas does not become lean so that even if the temperature of the catalytic apparatus is still high, catalyst deterioration can be prevented. On the other hand, the engine-brake force becomes smaller than that in the case where a fuel-cut is carried out and thus the vehicle deceleration is slightly sacrificed.

When the torque (Te) of the engine 1 is lowered, the engine speed (Ne) usually drops as shown by the dotted line (in fact, a slight delay occurs). However, in the present embodiment, MG1 connected with the output shaft 1a of the engine 1 via the sun gear 2a, planetary gear 2b, and the like is operated as the motor simultaneously with lowering of the torque (Te) of the engine 1. Accordingly, the torque (Te) is lowered, but the engine speed (Ne) does not drop. Of course, in this case, the throttle valve is opened and an amount of intake air passing through the throttle valve per unit time is increased. An amount of intake air per one cycle does not change and thus, in the case where an amount of intake air is controlled by at least one of opening period and a lifting amount of the intake valve, changes to these parameters are not required. Accordingly, before a time (t2) when the engine speed (Ne) is lowered, a large amount of exhaust gas, at a not-lean condition, flows into the catalytic apparatus and thus the temperature (TM) of the catalytic apparatus can be rapidly lowered.

Thereafter, the engine speed (Ne) is lowered and thus the temperature (TM) of the catalytic apparatus can be lowered to the threshold (TM') which is used to determine that the temperature is high at a time (t3) as shown by the solid line. Therefore, the temperature (TM) can be lowered to the threshold more quickly than in the case where the engine speed (Ne) is lowered simultaneously with lowering of the torque (Te) of the engine 1. Accordingly, after the time (t3), a fuel-cut can be started in the engine 1 without a problem of catalyst deterioration. Thus, a large engine brake force can be produced to realize a good vehicle deceleration.

Further, with the operation of MG1 as the motor, the electric energy of the battery 8 is consumed and thus a possibility in which the battery 8 is charged excessively can be avoided. Therefore, a period in which MG2 can be used as the generator can be extended.

In the present embodiment, when the torque (Te) is lowered, the engine speed (Ne) is not lowered. Of course, if MG1 is operated as the motor so that the engine speed (Ne) is slightly elevated, this is effective for cooling of the catalytic apparatus and prevention of an excessive battery charge. However, it is preferable to elevate the engine speed as much as possible by MG1.

In the present embodiment, the three-shaft-type power input and output device 2 is used. However, this does not limit the present invention. MG1 may be a motor-generator connected to the drive shaft of the vehicle directly or indirectly via a gear or gears. MG2 may be a motor-generator connected to the output shaft of the engine directly or indirectly via a gear or gears. Further, even if MG1 is not provided, an automatic transmission may be provided. If a down-shift of the automatic transmission keeps the torque (Te) at 0 and the engine speed increases, a large amount of exhaust gas can favorably cool the catalytic apparatus.

Thus, according to the device for restraining the deterioration of a catalytic apparatus of an internal combustion engine of the present invention, when the temperature of the catalytic apparatus arranged in the exhaust system is higher than a predetermined temperature in a vehicle deceleration, a fuel-cut is prohibited in the engine and a first motor-generator connected to the drive shaft of the vehicle is operated as the generator so that the electrical accumulator is charged. Therefore, the exhaust gas in a lean condition does not flow in the catalytic apparatus of which the temperature is high and, thus, the deterioration of the catalyst can be restrained. Further, a fuel-cut is not carried out and thus a large engine-brake cannot be produced, but the first motor-generator is operated as the generator to give a load to the drive shaft of the vehicle and thus a good vehicle deceleration can be realized.

The invention claimed is:

1. A device for restraining the deterioration of a catalytic apparatus of an internal combustion engine, wherein
when a temperature of the catalytic apparatus arranged in the engine exhaust system is higher than a predetermined temperature in a vehicle deceleration, a fuel-cut of the engine is prohibited and a first motor-generator connected with a vehicle drive shaft is operated as a generator that charges an electricity accumulator, and
when an amount of charge in the electricity accumulator reaches a predetermined value, the operation of the first motor-generator, as a generator, is stopped and a fuel-cut starts in the engine.

2. A device for restraining the deterioration of a catalytic apparatus of an internal combustion engine according to claim 1, wherein when the fuel-cut is prohibited, the engine operates such that the torque of an output shaft of the engine becomes 0.

3. A device for restraining the deterioration of a catalytic apparatus of an internal combustion engine according to claim 1, wherein when the fuel-cut is prohibited, a down-shift of an automatic transmission elevates engine speed.

4. A device for restraining the deterioration of a catalytic apparatus of an internal combustion engine according to claim 1, wherein when the fuel-cut is prohibited, a second motor-generator connected with an output shaft of the engine is operated as a motor to elevate engine speed.

5. A device for restraining the deterioration of a catalytic apparatus of an internal combustion engine according to claim 4, wherein the second motor-generator uses the electrical energy stored in the electricity accumulator.

6. A device for restraining the deterioration of a catalytic apparatus of an internal combustion engine, wherein
when a temperature of the catalytic apparatus arranged in the engine exhaust system is higher than a predetermined temperature in a vehicle deceleration, a fuel-cut of the engine is prohibited and a first motor-generator connected with a vehicle drive shaft is operated as a generator that charges an electricity accumulator, and
when an amount of charge in the electricity accumulator reaches a predetermined value, the operation of the first motor-generator as the generator is stopped and the engine operates in a condition in which an amount of intake air is minimized but such that the engine is not stopped.

7. A device for restraining the deterioration of a catalytic apparatus of an internal combustion engine, wherein
when a temperature of the catalytic apparatus arranged in the engine exhaust system is higher than a predetermined temperature in a vehicle deceleration, a fuel-cut of the engine is prohibited and a first motor-generator connected with a vehicle drive shaft is operated as a generator that charges an electricity accumulator,
when the fuel-cut is prohibited, the engine operates such that the torque of the output shaft of the engine becomes 0, and
when an amount of charge in the electricity accumulator reaches a predetermined value, the operation of the first motor-generator as the generator is stopped and the engine operates in a condition in which the torque of the output shaft of the engine is lower than 0.

* * * * *